United States Patent
Sannomiya et al.

(10) Patent No.: US 10,213,889 B2
(45) Date of Patent: Feb. 26, 2019

(54) MACHINE TOOL AND CONTROL APPARATUS OF THE MACHINE TOOL

(71) Applicants: Citizen Watch Co., Ltd., Tokyo (JP); Citizen Machinery Co., Ltd., Nagano (JP)

(72) Inventors: Kazuhiko Sannomiya, Nagano (JP); Hitoshi Matsumoto, Nagano (JP); Nobuyoshi Imasaki, Hyogo (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 0 days.

(21) Appl. No.: 15/506,793

(22) PCT Filed: Aug. 27, 2015

(86) PCT No.: PCT/JP2015/074157
§ 371 (c)(1),
(2) Date: Feb. 27, 2017

(87) PCT Pub. No.: WO2016/031897
PCT Pub. Date: Mar. 3, 2016

(65) Prior Publication Data
US 2017/0246718 A1    Aug. 31, 2017

(30) Foreign Application Priority Data
Aug. 29, 2014  (JP) .................................. 2014-174765

(51) Int. Cl.
*B23Q 15/00*    (2006.01)
*B23Q 15/013*   (2006.01)
(Continued)

(52) U.S. Cl.
CPC ............ *B23Q 15/013* (2013.01); *B23B 25/02* (2013.01); *G05B 19/416* (2013.01); *G05B 2219/36204* (2013.01); *G05B 2219/49355* (2013.01)

(58) Field of Classification Search
CPC .......... B23Q 15/013; B23Q 5/22; B23Q 5/28; B23Q 5/32; B23B 25/02; B23B 27/22; B23B 29/125
See application file for complete search history.

(56) References Cited

U.S. PATENT DOCUMENTS 4,693,146 A    9/1987  Dombrowski et al.
5,019,115 A *  5/1991  Schneider ............... B23B 25/02
                                            82/1.11
(Continued)

FOREIGN PATENT DOCUMENTS

CN    103781576 A      5/2014
DE    102013104923 B3  9/2014
(Continued)

OTHER PUBLICATIONS

Sannomiya et al., U.S. Appl. No. 15/129,238, filed Sep. 26, 2016 on Control Device for Machine Tool Including the Control Device.
(Continued)

*Primary Examiner* — Will Fridie, Jr.
(74) *Attorney, Agent, or Firm* — Howson & Howson LLP

(57) ABSTRACT

In a machine tool and a control apparatus thereof, a repetitive movement unit is configured so that the cutting tool performs one repetitive movement with respect to multiple relative rotations between the workpiece and the cutting tool and so that a rotation angle of the relative rotation between the workpiece and the cutting tool during relative movement at a second speed is smaller than a rotation angle of the relative rotation during relative movement at a first speed in one repetitive movement. This configuration limits degradation of machining efficiency when the cutting tool machines the workpiece by performing one repetitive movement with respect to multiple relative rotations between the workpiece and the cutting tool.

5 Claims, 9 Drawing Sheets

(51) Int. Cl.
*B23B 25/02* (2006.01)
*G05B 19/416* (2006.01)

(56) References Cited

U.S. PATENT DOCUMENTS

| | | | | |
|---|---|---|---|---|
| 5,778,745 | A * | 7/1998 | Furusawa | B23B 25/02 451/28 |
| 5,911,802 | A * | 6/1999 | Kimura | B23B 25/02 408/17 |
| 7,216,571 | B2 * | 5/2007 | Schreiber | B23B 1/00 407/69 |
| 7,788,998 | B2 * | 9/2010 | Ethington | B23B 1/00 310/328 |
| 8,662,959 | B2 * | 3/2014 | Kuriyama | B23B 1/00 408/10 |
| 9,193,115 | B2 * | 11/2015 | Fujimoto | B23B 1/00 |
| 9,975,211 | B2 | 5/2018 | Hariki et al. | |
| 2007/0221019 | A1 | 9/2007 | Ethington et al. | |
| 2015/0277419 | A1 * | 10/2015 | Sato | B23Q 15/013 700/114 |

FOREIGN PATENT DOCUMENTS

| | | |
|---|---|---|
| JP | 49-6573 A | 1/1974 |
| JP | S61182705 A | 8/1986 |
| JP | 5139591 B1 | 11/2012 |
| WO | 03/086688 A1 | 10/2003 |

OTHER PUBLICATIONS

Kitakaze et al., U.S. Appl. No. 15/129,242, filed Sep. 26, 2016 on Control Device for Machine Tool and Machine Tool Including the Control Device.
European Patent Office Extended European Search Report, dated Jul. 10, 2018, European Patent Office, The Hague.

* cited by examiner

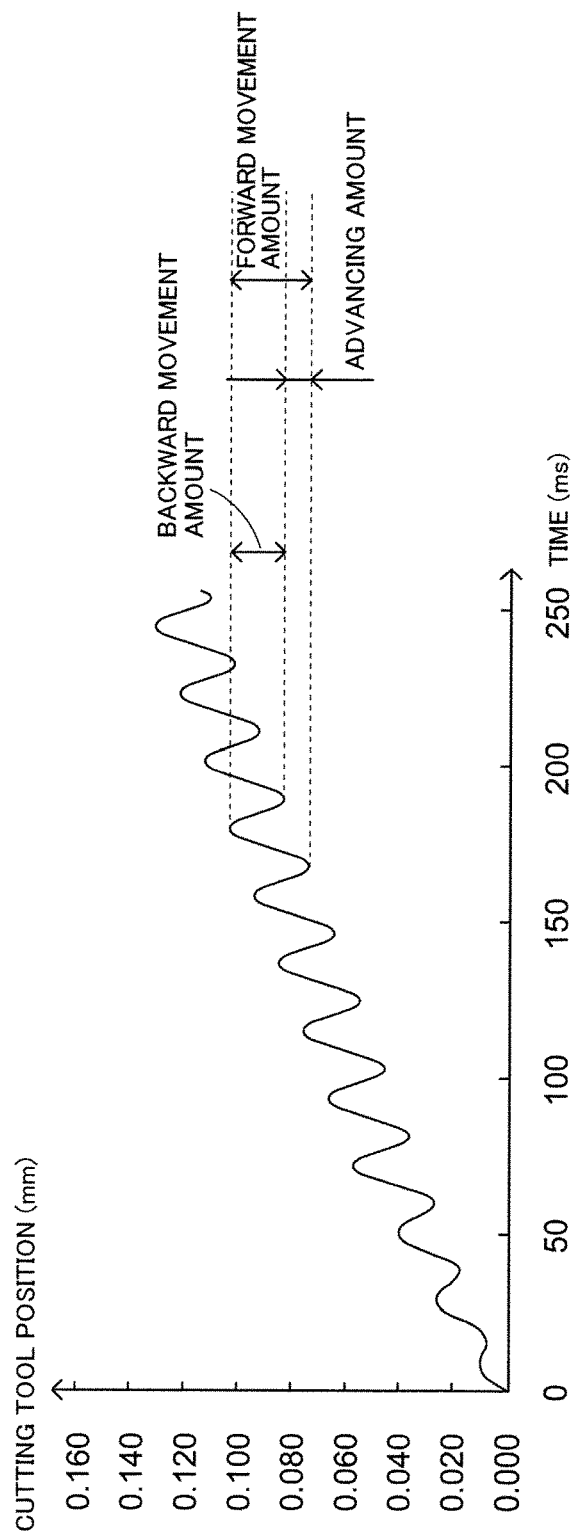

MACHINE TOOL AND CONTROL APPARATUS OF THE MACHINE TOOL

FIELD OF THE INVENTION

The present invention relates to a machine tool that machines a workpiece while sequentially separating a chip generated during cutting work, and also relates to a control apparatus of the machine tool.

BACKGROUND OF THE INVENTION

Conventionally, a machine tool is known that includes a workpiece holding unit to hold a workpiece, a tool rest to hold a cutting tool for cutting the workpiece, a feeding unit to feed the cutting tool toward the workpiece in a predetermined feeding direction via relative movement between the workpiece holding unit and the tool rest, a repetitive movement unit to repetitively move the workpiece holding unit and the tool rest in a mutually relative manner by repeating the relative movement in the feeding direction at a first speed and a second speed that are mutually different, and a rotating unit to relatively rotate the workpiece and the cutting tool, the machine tool being capable of machining the workpiece via the relative rotation between the workpiece and the cutting tool and via the feeding of the cutting tool toward the workpiece with the repetitive movement. Examples of such machine tools are described in Japanese Patent No. 5139591 (see particularly paragraph 0039), and in Japanese Laid-Open Patent application No. H10-43901 (see paragraph 0019).

When one of these machine tool machines a workpiece, a cutting work position of a forward movement of a reciprocal vibration, which is one example of the repetitive movement, overlaps with a cutting work position of a backward movement of the reciprocal vibration. Thus, the cutting tool performs an "air cut," in which the cutting tool simply moves without performing actual cutting during the backward movement because a part of the workpiece that is supposed to be cut in the backward movement has already been cut in the forward movement. Due to this, it is possible to machine a workpiece smoothly while sequentially separating a chip generated from the workpiece during the cutting work.

When the reciprocal vibration is performed such that the cutting work position of the forward movement overlaps the cutting work position of the backward movement, especially when the number of the reciprocal vibrations with respect to one rotation of a spindle that holds and rotates a workpiece is less than one, i.e., when the cutting tool vibrates once with respect to multiple rotations of the spindle, it is desirable to have a reciprocal vibration pattern that is capable of limiting degradation of machining efficiency.

For example, suppose that, in a reciprocal vibration pattern in which the reciprocal vibration is performed once with respect to four rotations of the spindle, which causes a tool edge of the cutting tool to trace a path in the form of a reciprocal vibration waveform illustrated in FIG. 6A, the path traced during a first rotation of the spindle, the path traced during a second rotation of the spindle, the path traced during a third rotation of the spindle, and the path traced during a fourth rotation of the spindle are indicated by a, b, c, and d, respectively. If the cutting tool performs a forward movement during the first and second rotations and performs a backward movement during the third and fourth rotations, the paths a to d with respect to the phase of the spindle can be illustrated as shown in FIG. 6B. In this case, an air cut occurs after an intersection point CT between the path c and the path d. This means that the air cut by the cutting tool occurs after the cutting work position of the backward movement overlaps the cutting work position of the forward movement in the third rotation of the spindle, and continues until the end of the fourth rotation of the spindle. Thus, the air cut is performed for more than one rotation of the spindle, causing degradation of cutting efficiency.

Thus, it is an object of the present invention to address the above problem of the conventional art by providing a machine tool that is capable of limiting degradation of machining efficiency when a cutting tool machines a workpiece by performing one repetitive movement with respect to multiple relative rotations between the workpiece and the cutting tool, and by providing a control apparatus of the machine tool.

SUMMARY OF THE INVENTION

According to a first aspect of the present invention, the above problem is addressed by a machine tool comprising: a workpiece holding unit to hold a workpiece; a tool rest to hold a cutting tool for cutting the workpiece; a feeding unit to feed the cutting tool toward the workpiece in a predetermined feeding direction via relative movement between the workpiece holding unit and the tool rest; a repetitive movement unit to repetitively move the workpiece holding unit and the tool rest in a mutually relative manner by repeating the relative movement in the feeding direction at a first speed and a second speed that are mutually different; and a rotating unit to relatively rotate the workpiece and the cutting tool, the machine tool being capable of machining the workpiece via the relative rotation between the workpiece and the cutting tool and via the feeding of the cutting tool toward the workpiece with the repetitive movement, wherein the repetitive movement unit is configured so that the cutting tool performs one repetitive movement with respect to multiple relative rotations between the workpiece and the cutting tool and so that a rotation angle of the relative rotation during the relative movement at the second speed is smaller than a rotation angle of the relative rotation during the relative movement at the first speed in one repetitive movement.

According to a second aspect of the present invention, the first speed is set faster than the second speed.

According to a third aspect of the present invention, a reference angle position is set on the basis of a rotation angle position of the relative rotation at which a cutting work position of the relative movement at the first speed and a cutting work position of the relative movement at the second speed intersect each other, and the repetitive movement unit is configured so that, during one rotation from the reference angle position after the relative movement at the first speed is performed for the length of a predetermined number of the relative rotations from the reference angle position, the relative movement at the first speed switches to the relative movement at the second speed and the cutting work position of the relative movement at the second speed reaches the cutting work position of the relative movement at the first speed to complete one repetitive movement.

According to a fourth aspect of the present invention, the above problem is addressed by a control apparatus of a machine tool that includes: a workpiece holding unit to hold a workpiece; a tool rest to hold a cutting tool for cutting the workpiece; a feeding unit to feed the cutting tool toward the workpiece in a predetermined feeding direction via relative movement between the workpiece holding unit and the tool rest; a repetitive movement unit to repetitively move the workpiece holding unit and the tool rest in a mutually relative manner by repeating the relative movement in the feeding direction at a first speed and a second speed that are mutually different; and a rotating unit to relatively rotate the workpiece and the cutting tool, the machine tool being capable of machining the workpiece via the relative rotation between the workpiece and the cutting tool and via the feeding of the cutting tool toward the workpiece with the repetitive movement, wherein the repetitive movement unit is configured so that the cutting tool performs one repetitive movement with respect to multiple relative rotations between the workpiece and the cutting tool and so that a rotation angle of the relative rotation during the relative movement at the second speed of one repetitive movement is smaller than a rotation angle of the relative rotation during the relative movement at the first speed of the one repetitive movement.

According to the machine tool of the first or second aspect of the present invention, the rotation angle of the relative rotation during the relative movement at the second speed is smaller than the rotation angle of the relative rotation during the relative movement at the first speed in one repetitive movement. Thus, the workpiece can be cut efficiently while the repetitive movement due to the relative movement at the mutually different first and second speeds is performed. Particularly, it is possible to limit degradation of machining efficiency when the repetitive movement constitutes a vibration.

According to the machine tool of the third aspect of the present invention, the time period of a so-called air cut, in which the cutting tool leaves the workpiece and simply moves without performing actual cutting, during the relative movement at the second speed can be limited to further increase the machining efficiency.

According to the control apparatus of the machine tool of the fourth aspect of the present invention, the same effects achieved by the first aspect of the present invention can also be achieved by the control apparatus of the machine tool.

BRIEF DESCRIPTION OF THE DRAWINGS

FIG. 3 is a diagram illustrating the reciprocal vibration and position of the cutting tool in the embodiment of the present invention.

DETAILED DESCRIPTION OF THE PREFERRED EMBODIMENTS

A machine tool and a control apparatus of the machine tool according to an aspect of the present invention may be embodied in an any manner as long as the repetitive movement unit is configured so that the cutting tool performs one repetitive movement with respect to multiple relative rotations between the workpiece and the cutting tool and so that a rotation angle of the relative rotation during the relative movement at the second speed is smaller than a rotation angle of the relative rotation during the relative movement at the first speed in one repetitive movement, for making it possible to cut the workpiece efficiently while the repetitive movement due to the relative movement at the mutually different first and second speeds is performed and to limit degradation of machining efficiency particularly when the repetitive movement constitutes a vibration.

Figure 1:
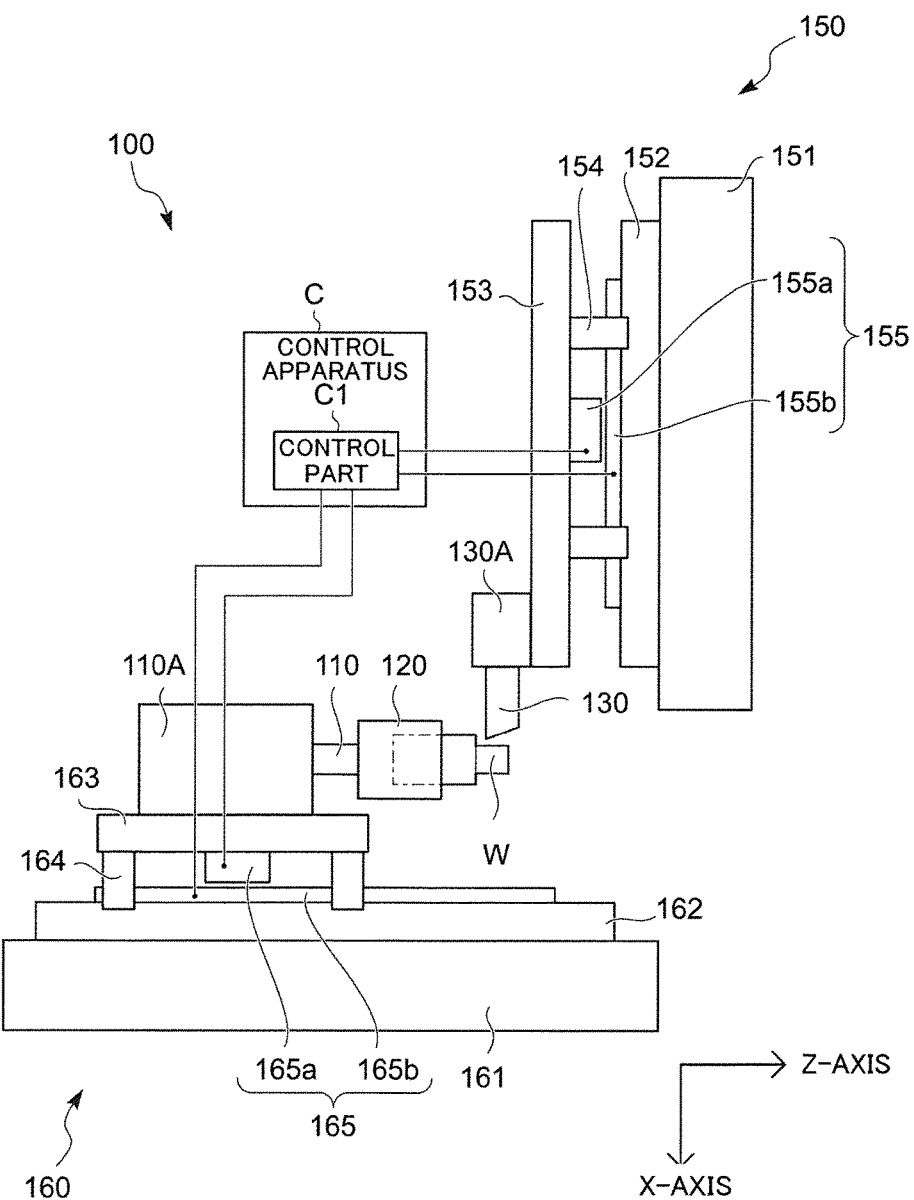
FIG. 1 is a schematic diagram illustrating a machine tool of an embodiment of the present invention.

FIG. 1 is a diagram illustrating a machine tool 100 having a control apparatus C that is an embodiment of the present invention. The machine tool 100 includes a spindle 110 and a cutting tool rest 130A. The spindle 110 has a chuck 120 provided at a tip thereof. A workpiece W is held by the spindle 110 via the chuck 120, and the spindle 110 is configured as a workpiece holding unit to hold a workpiece. The spindle 110 is supported by a spindle stock 110A so as to be rotatably driven by a spindle motor that is not shown. As the spindle motor, a conventional built-in motor or the like formed between the spindle stock 110A and the spindle 110 may be used in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 moves in the Z-axis direction by the Z-axis direction feeding mechanism 160 via the spindle stock 110A. The Z-axis direction feeding mechanism 160 constitutes a spindle moving mechanism for moving the spindle 110 in the X-axis direction.

The Z-axis direction feeding mechanism 160 includes a base 161, which is integral a side on which the Z-axis direction feeding mechanism 160 is fixed, such as the bed side, and a Z-axis direction guide rail 162 provided on the base 161 so as to extend in the Z-axis direction. A Z-axis direction feeding table 163 is slidably supported on the Z-axis direction guide rail 162 via a Z-axis direction guide 164. A mover 165a of a linear servo motor 165 is provided on the side of the Z-axis direction feeding table 163, and a stator 165b of the linear servo motor 165 is provided on the side of the base 161.

The spindle stock 110A is mounted on the Z-axis direction feeding table 163, and the Z-axis direction feeding table 163 is driven by the linear servo motor 165 to move in the Z-axis direction. Due to the movement of the Z-axis direction feeding table 163, the spindle stock 110A moves in the Z-axis direction, making the spindle 110 move in the X-axis direction.

A cutting tool 130, such as a bite, for cutting the workpiece W is attached to the cutting tool rest 130A. The cutting tool rest 130A constitutes a tool rest that holds the cutting tool 130. The cutting tool rest 130A is provided on a bed side of the machine tool 100 so as to be movable in an X-axis direction, which is perpendicular to the Z-axis direction, and in a Y-axis direction, which is perpendicular to both the Z-axis direction and the X-axis direction, by an X-axis direction feeding mechanism 150 and a Y-axis direction feeding mechanism that is not illustrated. The X-axis direction feeding mechanism 150 and the Y-axis direction feeding mechanism constitute a tool rest moving mechanism for moving the cutting tool rest 130A in the X-axis direction and the Y-axis direction with respect to the spindle 110.

The X-axis direction feeding mechanism 150 includes a base 151, which is integral with a side on which the X-axis direction feeding mechanism 150 is fixed, and an X-axis direction guide rail 152 provided on the base 151 so as to extend in the X-axis direction. An X-axis direction feeding table 153 is slidably supported on the X-axis direction guide rail 152 via an X-axis direction guide 154.

A mover 155a of a linear servo motor 155 is provided on the side of the X-axis direction feeding table 153, and a stator 155b of the linear servo motor 155 is provided on the side of the base 151. The X-axis direction feeding table 153 is driven by the linear servo motor 155 to move in the X-axis direction. The Y-axis direction feeding mechanism is structurally similar to the X-axis direction feeding mechanism 150, except being arranged in the Y-axis direction. Thus, the detailed description and illustration of the Y-axis direction feeding mechanism are omitted.

In FIG. 1, the X-axis direction feeding mechanism 150 is mounted on the bed side via the Y-axis direction feeding mechanism that is not shown, and the cutting tool rest 130A is mounted on the X-axis direction feeding table 153. The cutting tool rest 130A moves in the X-axis direction by being driven by the X-axis direction feeding table 153, and also moves in the Y-axis direction by being driven by the Y-axis direction feeding mechanism, which operates similarly to the X-axis direction feeding mechanism 150.

Alternatively, the Y-axis direction feeding mechanism that is not shown may be mounted on the bed side via the X-axis direction feeding mechanism 150, and the cutting tool rest 130A may be mounted on the side of the Y-axis direction feeding mechanism. The structure for moving the cutting tool rest 130A in the X-axis direction and the Y-axis direction by the X-axis direction feeding mechanism and the Y-axis direction feeding mechanism 150 is conventionally known and thus the detailed description and illustration of the structure are omitted.

The tool rest moving mechanism (the X-axis direction feeding mechanism 150 and the Y-axis direction feeding mechanism) and the spindle moving mechanism (the Z-axis direction feeding mechanism 160) operate cooperatively, and the cutting tool 130 attached to the cutting tool rest 130A is fed in any feeding direction with respect to the workpiece W via the movement of the cutting tool rest 130A in the X-axis direction and the Y-axis direction by the X-axis direction feeding mechanism 150 and the Y-axis direction feeding mechanism as well as via the movement of the spindle stock 110A (the spindle 110) in the Z-axis direction by the Z-axis direction feeding mechanism 160.

Figure 2:
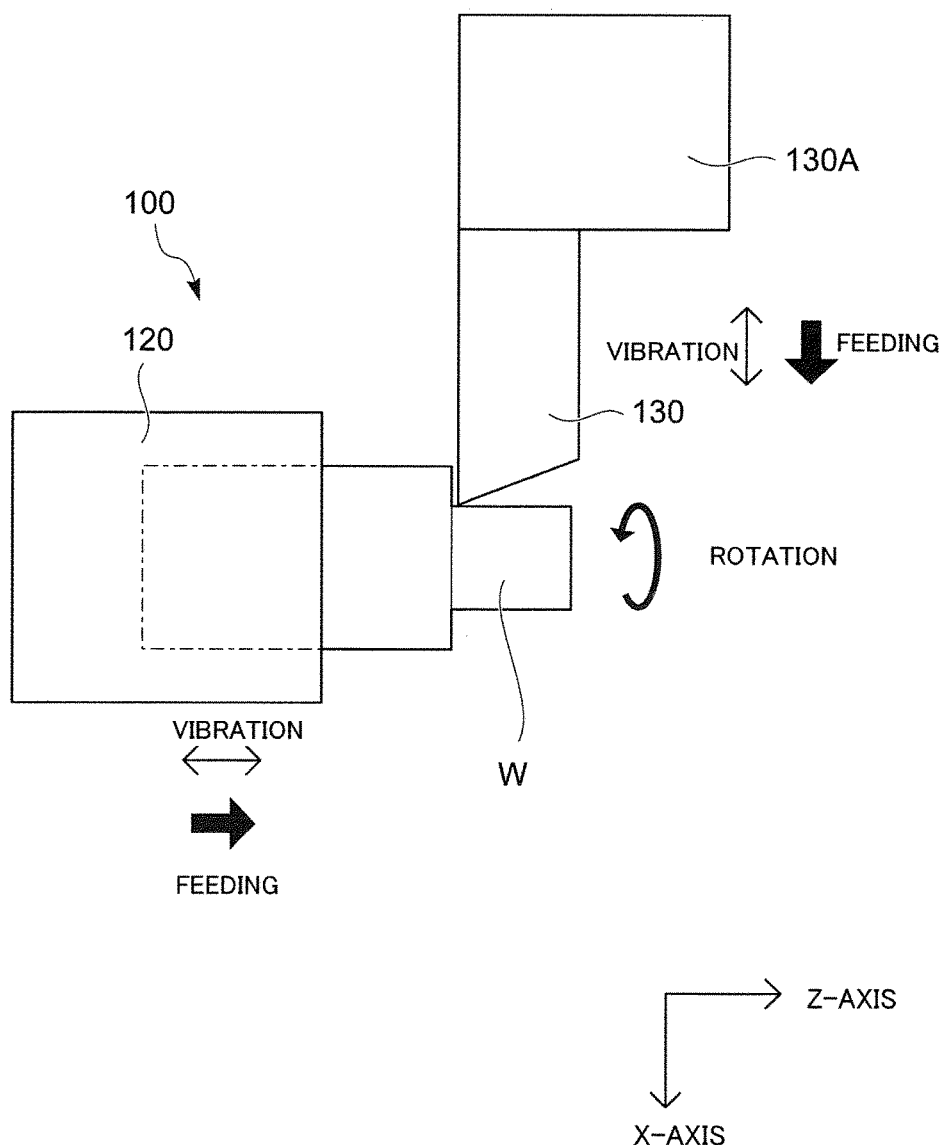
FIG. 2 is a schematic diagram illustrating the relationship between a cutting tool and a workpiece in the embodiment of the present invention.

As illustrated in FIG. 2, the workpiece W is cut with the cutting tool 130 into any shape by feeding the cutting tool 130 in any feeding direction with respect to the workpiece W by a feeding unit consisting of the spindle moving mechanism (the Z-axis direction feeding mechanism 160) and the tool rest moving mechanism (the X-axis direction feeding mechanism 150 and the Y-axis direction feeding mechanism).

In this embodiment, both the spindle stock 110A and the cutting tool rest 130A are movable. Alternatively, the spindle stock 110A may be fixed on the bed side of the machine tool 100 and the tool rest moving mechanism may be configured to move the cutting tool rest 130A in the X-axis direction, the Y-axis direction, and the Z-axis direction. In the latter case, the feeding unit may be consist of the tool rest moving mechanism that moves the cutting tool rest 130A in the X-axis direction, the Y-axis direction, and the Z-axis direction, and the cutting tool 130 may be fed toward the workpiece W by moving the cutting tool rest 130A with respect to the spindle 110 that is fixedly positioned and rotatably driven.

Also, the cutting tool rest 130A may be fixed on the bed side of the machine tool 100 so as to be not movable and the spindle moving mechanism may be configured so as to move the spindle stock 110A in the X-axis direction, the Y-axis direction, and the Z-axis direction. In this case, the feeding unit may be consist of the spindle moving mechanism that moves the spindle stock 110A in the X-axis direction, the Y-axis direction, and the Z-axis direction, and the cutting tool 130 may be fed toward the workpiece W by moving the spindle stock 110A with respect to the cutting tool rest 130A that is fixedly positioned.

Although the X-axis direction feeding mechanism 150, the Y-axis direction feeding mechanism, and the Z-axis direction feeding mechanism 160 are configured to be driven by a linear servo motor in this embodiment, they may be driven by a conventional mechanism consisting of a ball screw and a servo motor, for example.

In this embodiment, a rotating unit to relatively rotate the workpiece W and the cutting tool 130 consists of the spindle motor such as the built-in motor, and the relative rotation between the workpiece W and the cutting tool 130 is achieved by rotatably driving the spindle 110. Although the present embodiment is configured so that the workpiece W is rotated with respect to the cutting tool 130, the cutting tool 130 may be rotated with respect to the workpiece W. In the latter case, a rotating tool such as a drill may be used as the cutting tool 130. The rotation of the spindle 110, the Z-axis direction feeding mechanism 160, the X-axis direction feeding mechanism 150, and the Y-axis direction feeding mechanism are driven and controlled by a control part C1 of the control apparatus C. The control part C1 is preconfigured to control so that the spindle stock 110A or the cutting tool rest 130A moves in any one of the X-axis direction, the Y-axis direction, and the Z-axis direction while the spindle 110 and the cutting tool 130 reciprocally vibrate in a relative manner as one example of the repetitive movement by repeating a relative movement between the spindle 110 and the cutting tool 130 at a first speed and a relative movement between the spindle 110 and the cutting tool 130 at a second speed, which is different from and slower than the first speed, in the any one of the X-axis direction, the Y-axis direction, and the Z-axis direction by utilizing one of the feeding mechanisms as a repetitive movement unit.

As illustrated in FIG. 3, due to the control of the control part C1, each of the feeding mechanisms forwardly moves the spindle 110 or the cutting tool rest 130A (forward movement) for a predetermined forward movement amount as the relative movement at the first speed and then backwardly moves the spindle 110 or the cutting tool rest 130A (backward movement) for a predetermined backward movement amount as the relative movement at the second speed in each reciprocal vibration, so that the spindle 110 or the cutting tool rest 130A moves in a respective direction for an advancing amount that is equal to the difference between the forward movement amount and the backward movement amount. By doing so, the feeding mechanisms cooperatively feed the cutting tool 130 toward the workpiece W in any feeding direction.

Figure 4A:
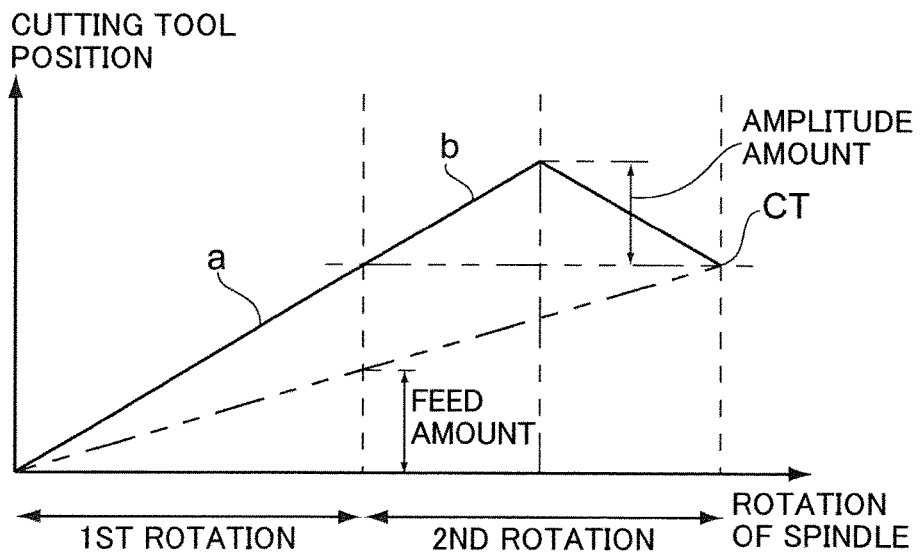
FIG. 4A is a diagram illustrating the position of the cutting tool in one reciprocal vibration.

As illustrated in FIG. 4A, due to the Z-axis direction feeding mechanism 160, the X-axis direction feeding mechanism 150, and the Y-axis direction feeding mechanism, the machine tool 100 machines the workpiece W by feeding the cutting tool 130 in any feeding direction on the basis of a feed amount, which is a part of the advancing amount achieved in one rotation of the spindle, or while the phase of the spindle changes from zero to 360 degrees. The control part C1 of the present embodiment controls the feeding unit so that the rotation angle of the spindle 110 during the backward movement is smaller than the rotation angle of the spindle 110 during the forward movement in one reciprocal vibration.

Figure 4B:
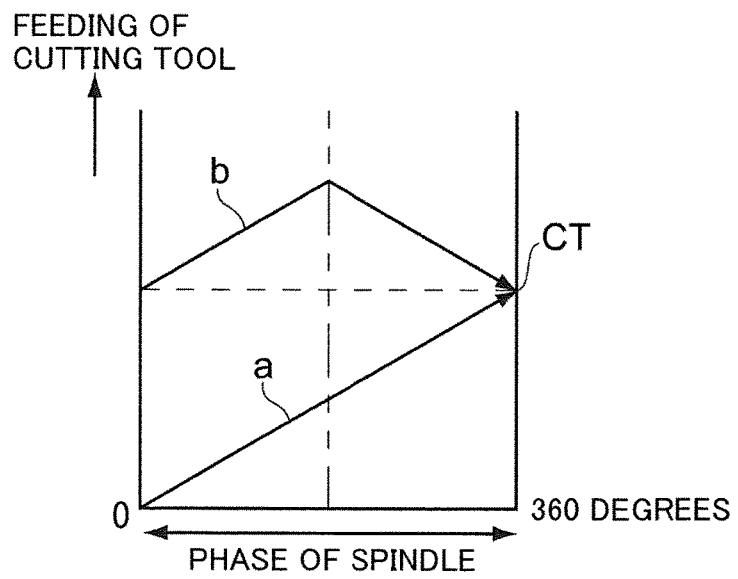
FIG. 4B is a diagram illustrating the paths traced by a cutting work position corresponding to FIG. 4A on the basis of a workpiece.

If the spindle stock 110A (spindle 110) or the cutting tool rest 130A (cutting tool 130) moves while reciprocally vibrates in accordance with the reciprocal vibration waveform illustrated in FIG. 4A while the workpiece W rotates for machining the workpiece W with the cutting tool 130 into a predetermined shape, the workpiece W is cut along a path a or path b in each rotation of the workpiece W as illustrated in FIG. 4B.

One example will now be described in which the number of vibrations N of the spindle stock 110A (spindle 110) or the cutting tool rest 130A with respect to one rotation of the workpiece W is 0.5 (the number of vibrations N=0.5), as illustrated in FIG. 4A.

As illustrated in FIG. 4A, the control part C1 controls the feeding unit so that the workpiece W is machined while the cutting tool 130 performs one reciprocal vibration for each two rotations of the spindle 110 (workpiece W).

In the present embodiment, the control part C1 controls so that the rotation angle of the spindle 110 during the backward movement of the cutting tool 130 is smaller than the rotation angle of the spindle 110 during the forward movement of the cutting tool 130 in one reciprocal vibration. In other words, the cutting tool 130 moves forward while the spindle 110 rotates 540 degrees and then moves backward while the spindle 110 rotates another 180 degrees so that, at the end of the second rotation of the spindle 110, the cutting work position of the forward movement of the cutting tool 130 comes into contact and overlaps with the cutting work position of the backward movement of the cutting tool 130.

Because of this, the cutting work position of the backward movement of the cutting tool 130 is theoretically included in the cutting work position of the forward movement of the cutting tool 130 as a "point" in each reciprocal vibration of the cutting tool 130. This makes an "air cut", in which the cutting tool 130 leaves the workpiece W, occur as a "point" in the backward movement of the cutting tool 130. Thus, a chip generated from the workpiece W during a machining operation is sequentially separated due to the air cut (that occurs at the point where the cutting work position of the forward movement of the cutting tool 130 comes into contact with the cutting work position of the backward movement of the cutting tool 130). Thus, the machine tool 100 can smoothly machine an outer surface of the workpiece W while separating a chip by the reciprocal vibration of the cutting tool 130 in a feeding direction.

Like the reciprocal vibration waveform illustrated in FIGS. 4A and 4B, the cutting work position of the forward movement comes into contact with the cutting work position of the backward movement at an intersection point CT between the path a traced in the first rotation of the spindle and the path b traced in the second rotation of the spindle. Thus, the air cut occurs as a "point", making a chip being separated into chip powder.

The amplitude of the reciprocal vibration illustrated in FIGS. 4A and 4B will now be described. Firstly, due to the preset feed amount of the cutting tool 130 toward the workpiece W, the start point of the path a traced by the cutting tool 130 in the first rotation of the spindle and the end point of the path b traced by the cutting tool 130 in the last of the multiple rotations (in this case, the second rotation) of the spindle are determined.

Next, an amplitude amount, which is the amount of backward movement of each reciprocal vibration in a feeding direction, is calculated and set so that the absolute value of a forward movement speed of the cutting tool 130 and the absolute value of a backward movement speed of the cutting tool 130 become equal to each other when the movement of the cutting tool 130 switches from forward to backward at 180 degrees in the last of the multiple rotations (in this example, the second rotation) of the spindle 110 that are performed while the cutting tool 130 performs one reciprocal vibration. In other words, it is calculated and set so that a part of the path b traced in the forward movement and a part of the path b traced in the backward movement constitute two sides of equal length of an isosceles triangle. When the amplitude amount is calculated, the path a traced by the cutting tool 130 and the path b braced by the cutting tool 130 are determined.

FIGS. 4A and 4B illustrate an example in which the origin of the spindle (the position of the spindle 110 at zero degree) predetermined as a reference for controlling the rotation of the spindle 110, for example, is used as a reference angle position and in which the cutting tool 130 starts a cutting work from the origin of the spindle.

The cutting tool 130 starts the reciprocal vibration from the origin of the spindle (zero degree). After moving forward while the spindle 110 performs a first rotation from the origin of the spindle, the cutting tool 130 switches its movement from forward to backward during a second rotation of the spindle 110 from another origin of the spindle. At the end of this second rotation, or when the spindle 110 reaches yet another origin of the spindle, the cutting work position of the backward movement reaches and comes into contact with the cutting work position of the forward movement, completing one reciprocal vibration. The cutting tool 130 then starts next reciprocal vibration from the yet another origin of the spindle. As a result, the cutting tool 130 does not continue the backward movement more than necessary from the point at which an air cut occurs, making it possible to increase machining efficiency.

The reference angle position is not necessarily the origin of the spindle and may be a predetermined rotation angle position of the spindle 110. The cutting work position of the backward movement reaches and comes into contact with the cutting work position of the forward movement at the reference angle position. In other words, the rotation angle position of the spindle 110 corresponding to the intersection point CT is set as the reference angle position. Even if the cutting work position of the backward movement comes into contact and overlaps with the cutting work position of the forward movement at the reference angle position as illustrated in FIGS. 4A and 4B, the cutting work position of the backward movement may not sufficiently come into contact with the cutting work position of the forward movement in an actual cutting work. Thus, as illustrated in FIGS. 4C and 4D, it is also possible to make the cutting tool 130 perform the reciprocal vibration while a predetermined overlap timing adjustment angle is set so that the intersection point CT is located at a predetermined rotation angle position of the spindle 110 before reaching the reference angle position.

Figure 4C:
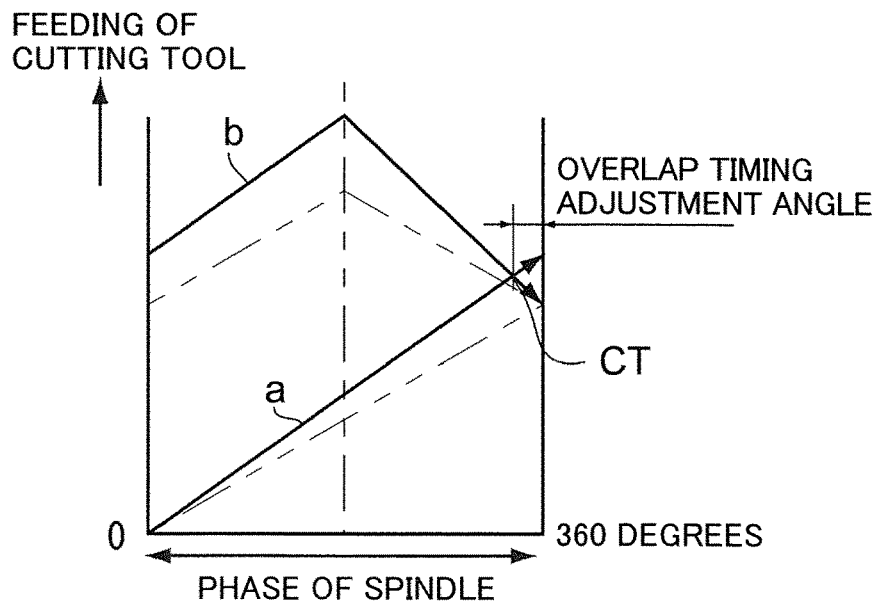
FIG. 4C is a diagram illustrating a modified version of FIG. 4B.
Figure 4D:
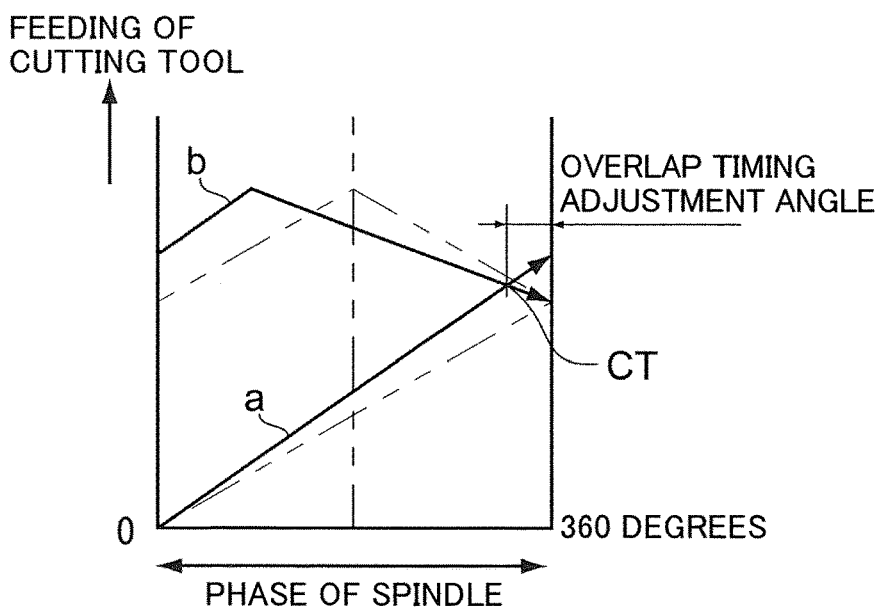
FIG. 4D is a diagram illustrating a modified version of FIG. 4B.

For example, the predetermined overlap timing adjustment angle can be set by changing the amplitude amount as illustrated in FIG. 4C. Also, the predetermined overlap timing adjustment angle can be set by reducing the phase of the spindle at which the cutting tool 130 switches its movement from forward to backward within the second rotation of the spindle without changing the amplitude amount of one reciprocal vibration as illustrated in FIG. 4. This makes the cutting work position of the forward movement overlaps with the cutting work position of the backward movement for the length of the overlap timing adjustment angle. The cutting tool 130 then performs an air cut in this overlapping period. Therefore, a chip can be reliably separated.

In this case, the reference angle position is determined as a rotation angle position of the spindle 110 calculated by adding the overlap timing adjustment angle to the rotation angle position corresponding to the intersection point CT.

Change of the phase of the spindle at which the cutting tool 130 switches its movement from forward to backward without changing the amplitude amount of one reciprocal vibration can be executed on the basis of a ratio between the rotation amount of the spindle with respect to one reciprocal vibration of the cutting tool 130 and the rotation amount of the spindle during the backward movement of the cutting tool 130. When the amplitude amount is set as illustrated in FIG. 4A and the cutting tool 130 switches its movement from forward to backward at a position between zero to 180 degrees in the last of the multiple rotations (in this example, the second rotation) of the spindle 110 performed while the cutting tool 130 performs one reciprocal vibration, the rotation amount of the spindle during the backward movement can be changed between 0.5 to 1.0 (180 to 360 degrees) without changing the amplitude amount. That is, as the rotation amount of the spindle during the backward movement increases, the apex of the path b of the cutting tool 130 illustrated in FIG. 4D moves left, making it possible to overlap the cutting work position of the forward movement with the cutting work position of the backward movement.

In this case, the slope of the path a of the cutting tool 130 becomes steeper and the right slope of the path b with respect to the apex (backward movement path) becomes gentler without changing the location of the end point of the path b of the cutting tool 130. Thus, the intersection point CT will be located between the apex of the path b and the end point of the path b.

If the control part C1 is configured so that the start of a vibrational cutting work, in which the cutting tool 130 is fed in a feeding direction while reciprocally vibrating in the feeding direction in a relative manner with respect to the workpiece W, is instructed in a machining program with a command G*P2, a value of the number of vibrations set to the control part C1 can be specified as the number of rotations of the spindle 110 with respect to one reciprocal vibration by using a value of E (argument E) succeeding the command G*P2, and the rotation amount of the spindle during the backward movement set to the control part C1 can be specified by using a value of R (argument R).

Because the cutting tool 130 switches to the backward movement after the forward movement is performed while the workpiece W rotates multiple times, cutting efficiency can be increased by increasing the feed amount of the cutting tool 130. Also, by increasing the rotation amount of the workpiece W during the forward movement and decreasing the rotation amount of the workpiece W during the backward movement, a cutting load acting on the cutting tool 130 can be reduced.

In the present embodiment, the number of vibrations N is set so that less than one reciprocal vibration is performed with respect to one rotation of the spindle 110 (workpiece W) (0< the number of vibrations N<1.0).

In the machine tool 100, an operation instruction by the control part C1 is executed at predetermined instruction cycles. The reciprocal vibration of the spindle stock 110A (spindle 110) or the cutting tool rest 130A (cutting tool 130) can be executed at predetermined frequencies that are based on the instruction cycles. The instruction cycles are determined on the basis of a reference cycle and are generally the integral multiples of the reference cycle.

The reciprocal vibration can be executed at frequencies that are in accordance with values of the instruction cycles. A frequency (vibration frequency) f (Hz) of the reciprocal vibration of the spindle stock 110A (spindle 110) or the cutting tool rest 130A (cutting tool 130) is set to a value selected from the frequencies.

When the spindle stock 110A (spindle 110) or the cutting tool rest 130A (cutting tool 130) reciprocally vibrates and the number of rotations of the spindle 110 is S (r/min), then the number of vibrations N can be calculated as $N=f*60/S$. The number of rotations S is inversely proportional to the number of vibrations N with the vibration frequency f as a constant.

The spindle 110 can be rotated at a faster speed by increasing the vibration frequency f or decreasing the number of vibrations N. If the number of vibrations N is less than 1.0, then the spindle 110 can be rotated at a high speed without decreasing cutting efficiency by controlling the reciprocal vibration with the control apparatus C.

As described above, the repetitive movement unit is configured so that the cutting tool 130 performs one repetitive movement with respect to multiple rotations of the spindle 110 and so that the rotation angle of the spindle 110 during the backward movement is smaller than the rotation angle of the spindle 110 during the forward movement in one repetitive movement. Thus, the machine tool 100 and the control apparatus C of the machine tool 100 as an embodiment of the present invention are capable of limiting degradation of machining efficiency when the cutting tool machines the workpiece W by performing one reciprocal vibration with respect to multiple rotations of the spindle 110.

Figure 5A:
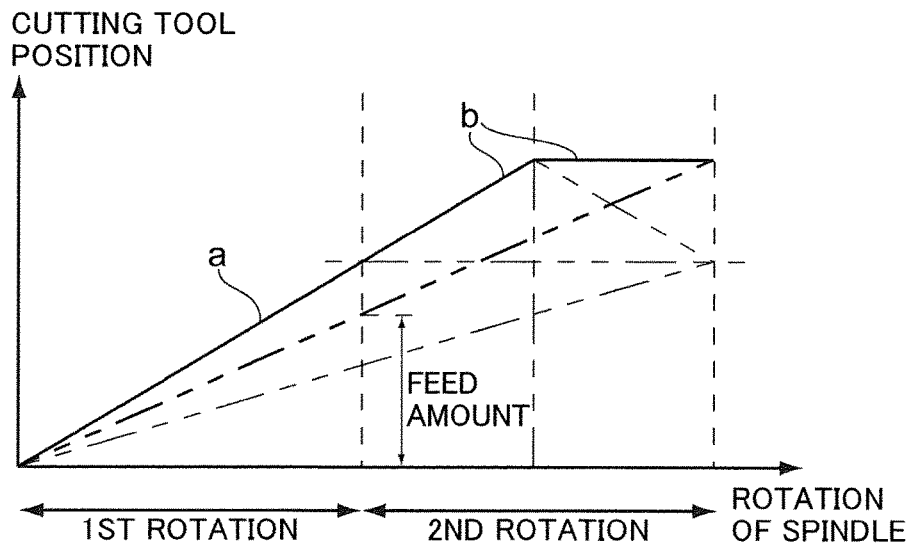
FIG. 5A is a diagram illustrating a first modification of the repetitive movement waveform illustrating the position of the cutting tool in one repetitive movement.

Also, the reference angle position is set on the basis of a rotation angle position of the spindle 110 at which the cutting work position of the backward movement and the cutting work position of the forward movement intersect with each other, and the repetitive movement unit is configured so that, during one rotation from the reference angle position after the forward movement is performed for the length of a predetermined number of rotations of the spindle 110 from the reference angle position, the forward movement switches to the backward and the cutting work position of the backward movement reaches the cutting work position of the forward movement to complete one vibration. Thus, it is possible to minimize a non-productive operation in a cutting work to increase machining efficiency Also, rather than repeating the forward movement as the relative movement at the first speed and the backward movement as the relative movement at the second speed as illustrated in FIG. 4A, the second speed may be set to zero to stop the relative movement in a feeding direction as illustrated in FIG. 5A. In this case, in comparison with the reciprocal vibration illustrated in FIG. 4A, it is possible to increase cutting efficiency by increasing the feed amount.

Figure 5B:
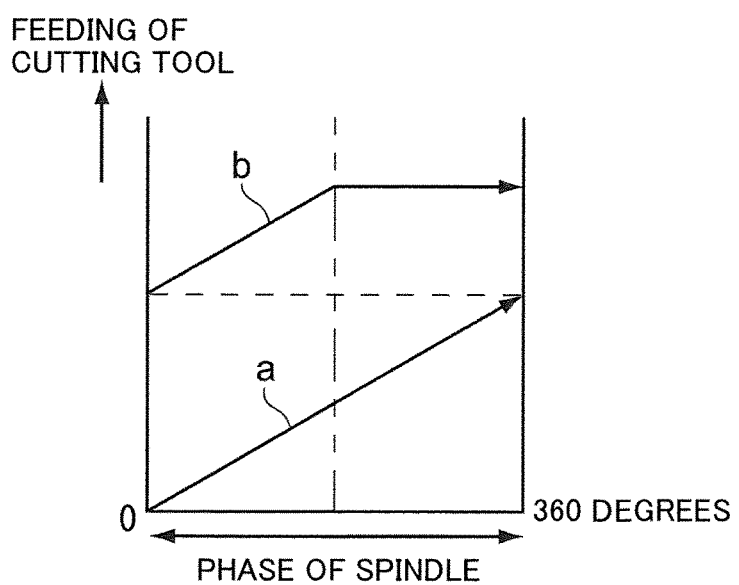
FIG. 5B is a diagram illustrating the paths traced by a cutting work position corresponding to FIG. 5A on the basis of a workpiece.

As illustrated in FIG. 5B, although the path a traced in the first rotation of the spindle does not intersect with the path b traced in the second rotation of the spindle when the second rotation completes, the distance between the path a and the path b becomes smaller. Thus, a chip generated from the workpiece W becomes narrower at this point, so that the chip can be easily folded and separated at this point into chip powder.

Figure 5C:
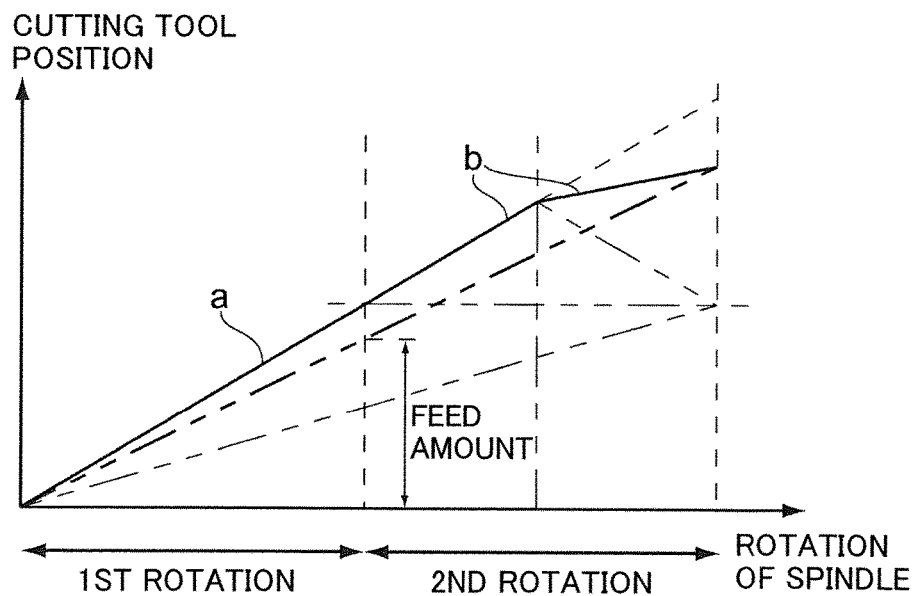
FIG. 5C is a diagram illustrating a second modification of the repetitive movement waveform illustrating the position of the cutting tool in one repetitive movement.

Also, rather than repeating the forward movement as the relative movement at the first speed and the backward movement as the relative movement at the second speed as illustrated in FIG. 4A, the relative movement at the second speed may be performed in the same direction as the relative movement at the first speed while the second speed is set slower than the first speed, as illustrated in FIG. 5C. In this case, in comparison with the repetitive movement illustrated in FIG. 5A, it is possible to increase cutting efficiency by increasing the feed amount.

Figure 5D:
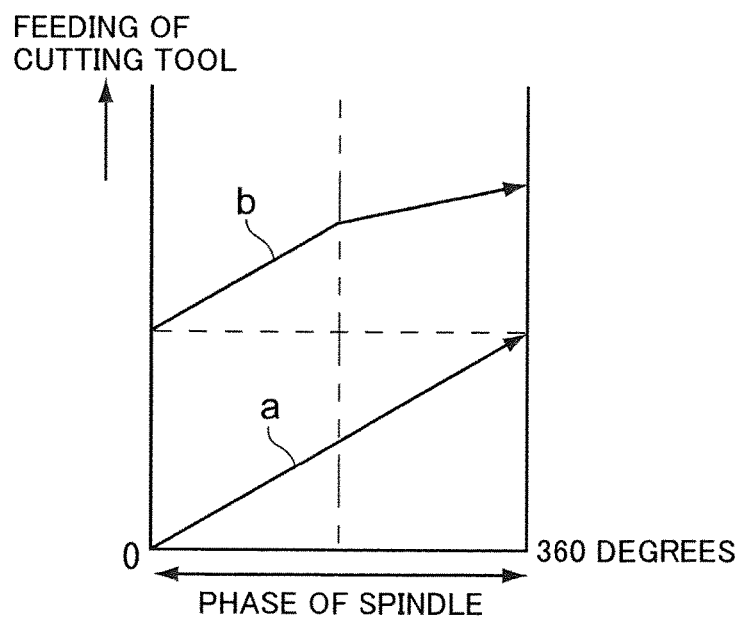
FIG. 5D is a diagram illustrating the paths traced by a cutting work position corresponding to FIG. 5C on the basis of a workpiece.
Figure 6A:
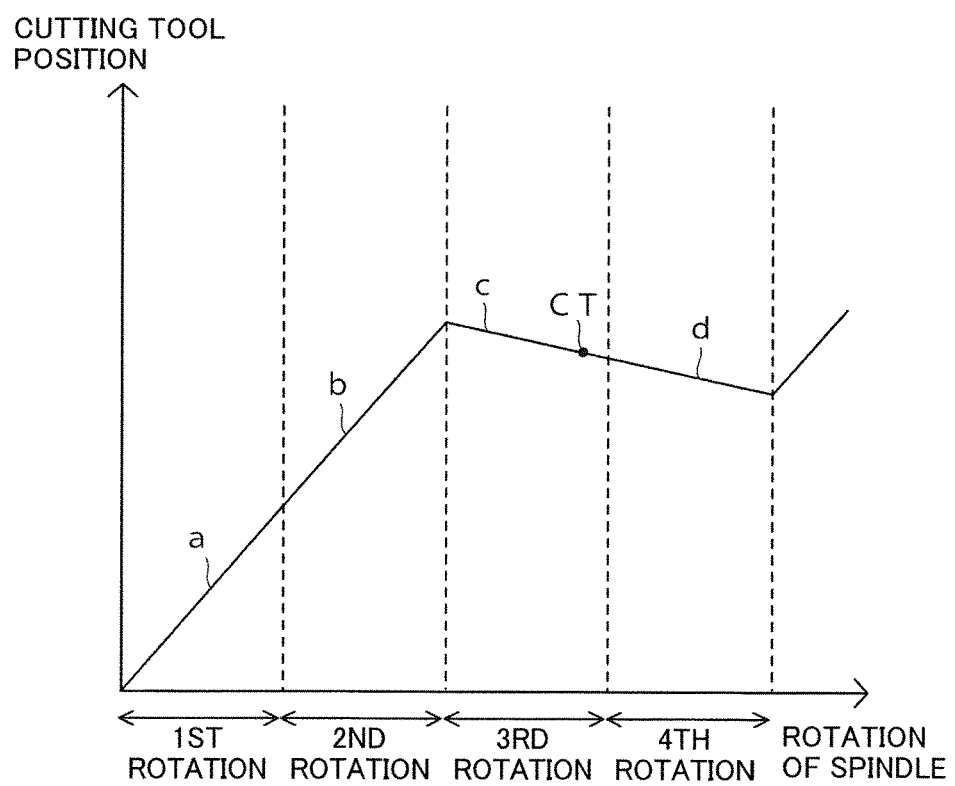
FIG. 6A is a diagram illustrating the position of the cutting tool in one reciprocal vibration.
Figure 6B:
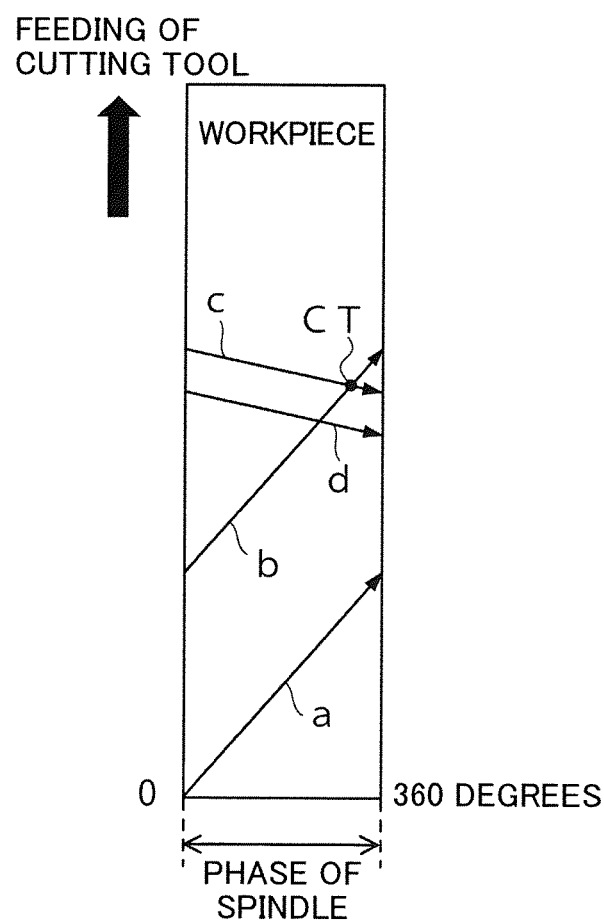
FIG. 6B is a diagram illustrating the paths traced by a cutting work position corresponding to FIG. 6A on the basis of a workpiece (a reciprocal vibration waveform of the conventional art).

As illustrated in FIG. 5D, although the path a traced in the first rotation of the spindle does not intersect with the path b traced in the second rotation of the spindle when the second rotation completes, the distance between the path a and the path b becomes smaller, as with the case illustrated in FIG. 5B. Thus, a chip generated from the workpiece W becomes narrower at this point, so that the chip can be easily folded and separated at this point into chip powder.

The invention claimed is:

1. A machine tool comprising:
   a workpiece holding unit to hold a workpiece;
   a tool rest to hold a cutting tool for cutting the workpiece;
   a feeding unit to feed the cutting tool toward the workpiece in a predetermined feeding direction via relative movement between the workpiece holding unit and the tool rest;
   a repetitive movement unit to reciprocally vibrate the workpiece holding unit and the tool rest in a mutually relative manner by repeating the relative movement in the feeding direction; and
   a rotating unit to relatively rotate the workpiece and the cutting tool;
   wherein the machine tool is capable of machining the workpiece via the relative rotation between the workpiece and the cutting tool and via the feeding of the cutting tool toward the workpiece with the reciprocal vibration; and
   wherein the repetitive movement unit is configured so that the cutting tool performs one vibration with respect to multiple relative rotations between the workpiece and the cutting tool and so that a rotation angle of the relative rotation during a backward movement is smaller than a rotation angle of the relative rotation during a forward movement in one reciprocal vibration.

2. The machine tool according to claim 1, wherein:
   a reference angle position is set on the basis of a rotation angle position of the relative rotation at which a cutting work position of the forward movement and a cutting work position of the backward movement intersect with each other; and
   the repetitive movement unit is configured so that, during one rotation from the reference angle position after the forward movement is performed for the length of a predetermined number of the relative rotations from the reference angle position, the forward movement switches to the backward movement and the cutting work position of the backward reaches the cutting work position of the forward movement to complete one reciprocal vibration.

3. The machine tool according to claim 1, including a control apparatus for controlling said feeding unit, said repetitive movement unit and said rotating unit.

4. A machine tool comprising:
   a cutting tool for cutting a workpiece;
   a rotating unit to relatively rotate the cutting tool and the workpiece;
   a feeding unit to feed the cutting tool and the workpiece in a predetermined feeding direction; and
   a repetitive movement unit to reciprocally vibrate the cutting tool and the workpiece in a mutually relative manner in the feeding direction;
   wherein the machine tool is capable of machining the workpiece via the relative rotation between the cutting tool and the workpiece and via the feeding of the cutting tool toward the workpiece with the reciprocal vibration and the repetitive movement unit is configured to vibrate so that a cutting work position of a forward movement of the reciprocal vibration overlaps with a cutting work position of a backward movement of the reciprocal vibration;
   wherein the repetitive movement unit is configured to vibrate the cutting tool and the workpiece so that a rotation angle of the relative rotation during the backward movement is smaller than a rotation angle of the relative rotation during the forward movement during one vibration while the cutting tool performs one vibration with respect to multiple relative rotations between the cutting tool and the workpiece;
   wherein a reference angle position at which the one vibration is complete is set by adding a predetermined rotation angle including a zero degree to a rotation angle position of the relative rotation at which the cutting work position of the forward movement comes into contact with the cutting work position of the backward movement; and
   the repetitive movement unit is configured so that, during one rotation of up to the reference angle position after the forward movement is performed for the length of a predetermined number of the relative rotations, the forward movement switches to the backward movement and the cutting work position of the backward movement overlaps with the cutting work position of the forward movement.

5. The machine tool according to claim 4, including a control apparatus for controlling said rotating unit, said feeding unit, and said repetitive movement unit.

* * * * *